(12) United States Patent
Lin et al.

(10) Patent No.: US 8,960,354 B2
(45) Date of Patent: Feb. 24, 2015

(54) COMBINATION STRUCTURE OF BICYCLE FRAME AND MOTOR HUB

(75) Inventors: Sheng Shan Lin, Tu Cheng (TW); Yu Chi Yu, Tu Cheng (TW)

(73) Assignees: Fairly Bike Manufacturing Co., Ltd., Tu Cheng (TW); Mystromer AG, Niederscherli (CH)

( * ) Notice: Subject to any disclaimer, the term of this patent is extended or adjusted under 35 U.S.C. 154(b) by 433 days.

(21) Appl. No.: 13/272,637

(22) Filed: Oct. 13, 2011

(65) Prior Publication Data

US 2013/0015009 A1    Jan. 17, 2013

(30) Foreign Application Priority Data

Jul. 11, 2011    (TW) ............................ 100212672 U

(51) Int. Cl.
| | |
|---|---|
| B62M 6/60 | (2010.01) |
| B62K 25/02 | (2006.01) |
| B60L 11/00 | (2006.01) |
| B62M 6/65 | (2010.01) |
| B60L 11/16 | (2006.01) |

(52) U.S. Cl.
CPC . B62M 6/65 (2013.01); B62M 6/60 (2013.01); B62K 25/02 (2013.01); B60L 11/007 (2013.01); B60L 11/16 (2013.01); B60L 2200/12 (2013.01); B60L 2220/44 (2013.01)
USPC .......................... 180/220; 180/65.51; 280/288

(58) Field of Classification Search
USPC ............ 180/65.51, 205, 207, 220; 280/281.1, 280/288
See application file for complete search history.

(56) References Cited

U.S. PATENT DOCUMENTS

| | | | | |
|---|---|---|---|---|
| 2,138,619 | A * | 11/1938 | Steinlein et al. | 180/205.5 |
| 3,610,659 | A * | 10/1971 | Gerarde | 280/169 |
| 3,976,307 | A * | 8/1976 | Ogisu | 280/279 |
| 5,549,315 | A * | 8/1996 | Ashman | 280/279 |
| 5,755,304 | A * | 5/1998 | Trigg et al. | 180/65.51 |
| 5,834,875 | A * | 11/1998 | Hill | 310/268 |
| 6,059,305 | A * | 5/2000 | Bollini | 280/281.1 |
| 6,089,675 | A * | 7/2000 | Schlanger | 301/124.2 |
| 6,278,216 | B1 * | 8/2001 | Li | 310/424 |
| 6,286,616 | B1 * | 9/2001 | Kutter | 180/206.5 |
| 6,355,996 | B1 * | 3/2002 | Birkestrand | 310/54 |
| 6,557,657 | B2 * | 5/2003 | Persson | 180/220 |
| RE39,528 | E * | 3/2007 | Kanehisa et al. | 301/110.5 |
| 7,195,088 | B2 * | 3/2007 | Matsueda et al. | 180/206.5 |
| 7,495,352 | B2 * | 2/2009 | Perlo et al. | 290/1 R |
| 8,075,010 | B2 * | 12/2011 | Talavasek et al. | 280/288 |
| 8,113,594 | B2 * | 2/2012 | Jones et al. | 301/124.2 |
| 8,395,291 | B2 * | 3/2013 | Calley et al. | 310/156.02 |
| 8,419,580 | B2 * | 4/2013 | Lo | 475/150 |
| 2002/0046891 | A1 * | 4/2002 | Honda et al. | 180/220 |

(Continued)

*Primary Examiner* — Anne Marie Boehler
*Assistant Examiner* — Maurice Williams
(74) *Attorney, Agent, or Firm* — Bacon & Thomas, PLLC

(57) ABSTRACT

A combination structure of bicycle frame and motor hub includes a bicycle frame, a motor hub, and an elongated axle. One can extend, from one side of the bicycle frame, the elongated axle through a through hole of the bicycle frame and the motor hub, and then with one hand, a tail end of the elongated axle can be fastened into an internal thread hole of the bicycle frame. This will facilitate assembly of the components of the motor hub and the bicycle frame. Besides, when screwing or unscrewing the elongated axle, since the elongated axle has passed through the through hole and the internal thread hole opposing each other at the bicycle frame, the motor hub will not fall accidentally, and convenience can be assured for maintenance staff during proceeding of maintenance work.

12 Claims, 3 Drawing Sheets

(56) References Cited

U.S. PATENT DOCUMENTS

| | | | |
|---|---|---|---|
| 2002/0120382 A1* | 8/2002 | Hatanaka et al. | 701/70 |
| 2003/0213630 A1* | 11/2003 | Pyntikov et al. | 180/220 |
| 2005/0029033 A1* | 2/2005 | Rip et al. | 180/220 |
| 2005/0045392 A1* | 3/2005 | Maslov et al. | 180/65.5 |
| 2005/0253356 A1* | 11/2005 | Matsueda et al. | 280/260 |
| 2007/0187952 A1* | 8/2007 | Perlo et al. | 290/1 R |
| 2007/0256873 A1* | 11/2007 | Masuda et al. | 180/220 |
| 2008/0054709 A1* | 3/2008 | Spahr et al. | 301/9.1 |
| 2008/0197602 A1* | 8/2008 | Watarai | 280/281.1 |
| 2009/0236818 A1* | 9/2009 | Addink | 280/281.1 |
| 2009/0243250 A1* | 10/2009 | Chiang | 280/260 |
| 2009/0243255 A1* | 10/2009 | Ashman | 280/288 |
| 2010/0295265 A1* | 11/2010 | Burdick | 280/261 |
| 2011/0169381 A1* | 7/2011 | Calley et al. | 310/67 R |
| 2011/0259658 A1* | 10/2011 | Huang et al. | 180/65.51 |
| 2011/0278818 A1* | 11/2011 | Talavasek et al. | 280/288 |
| 2012/0012412 A1* | 1/2012 | Moeller et al. | 180/206.2 |
| 2012/0025677 A1* | 2/2012 | Adachi | 310/67 R |
| 2012/0169154 A1* | 7/2012 | Curodeau | 310/43 |

\* cited by examiner

COMBINATION STRUCTURE OF BICYCLE FRAME AND MOTOR HUB

BACKGROUND OF THE INVENTION

1. Field of the Invention

The present invention relates to a combination structure of frame and motor hub, and more particularly, to a combination structure of frame and motor hub adapted for an electric bicycle.

2. Description of Related Art

Conventionally, the wheel axle of an electric bicycle is provided with a motor hub at the center of the axle for driving forward the electric bicycle, where both sides of the motor hub are pivotally arranged in between a fork assembly and are fastened and secured thereto with nuts. However, when assembly of the motor hub or replacement thereof, complex steps are required to manually detach the nuts from both sides of the motor hub so as to replace or maintain the same. Namely, when maintenance staff want to assemble or replace the motor hub, the nuts at both sides of the hub need to be tightly fastened manually so as to attach the hub; or on the other hand, the nuts need to be manually unfastened so as to detach the same from the bicycle frame. Such manual work is rather inconvenient, and the fastening or unfastening of the nuts is indeed time and labor consuming.

Further, the frame-fastening holes located at two sides of the conventional motor hub have downward U-shaped openings, where nuts are tightened toward the frame and the axle so as to secure the same. However, when disassembling the motor hub, suppose the axle of the motor hub escape suddenly from the U-shaped openings, and thus the motor hub falls and is damaged or even hurts people. This will add inconvenience to maintenance staff.

In view of the above, an innovative combination structure of bicycle frame and motor hub has been developed, through persistent experiments, so as to improve convenience and safety during maintenance or assembly of the electric bicycle.

SUMMARY OF THE INVENTION

An object of the present invention is to provide a combination structure of bicycle frame and motor hub, comprising a bicycle frame, a motor hub, and an elongated axle. The bicycle frame includes a first fork and a second fork which are oppositely arranged, wherein the first fork is provided with a through hole, while the second fork is recessed with an internal thread hole corresponding axially to the through hole, and the first fork is provided, at its inner side adjacent to the through hole, with a positioning groove. Further, the motor hub is provided, at its center, with a sleeve having an end, related to a positioning end, such that the positioning end can be engaged with and stopped at the positioning groove of the first fork, and that the sleeve cannot rotate. The elongated axle has a head end and a tail end, wherein the tail end has an external thread. The elongated axle can pass through the through hole of the first fork and the sleeve of the motor hub, and then the external thread of the tail end is engaged correspondingly and fastened into the internal thread hole of the second fork.

By means of the above-mentioned structure, the present invention provides a combination structure of bicycle frame and motor hub such that one can extend, from one side of the bicycle frame, the elongated axle through the through hole of the bicycle frame and the motor hub, and then with one hand, the tail end of the elongated axle can be fastened into the internal thread hole of the bicycle frame. This will facilitate assembly of the components of the motor hub and the bicycle frame. Besides, when screwing or unscrewing the elongated axle, since the elongated axle has passed through the through hole and the internal thread hole opposing each other at the bicycle frame, the motor hub will not fall accidentally, and convenience can be assured for maintenance staff during proceeding of maintenance work.

The combination structure of bicycle frame and motor hub, according to the present invention, further comprises a sprocket assembly including a coupling sleeve, a flywheel chain disk, and an end cap. The coupling sleeve is arranged, coaxially, to the motor hub. The flywheel chain disk is provided outside of the coupling sleeve such that the flywheel chain disk can rotate synchronously therewith. The flywheel chain disk is provided, radially, with at least one flywheel. This makes the electric bicycle have at least one or more stages of speed change during pedaling. According to the present invention, a plurality of axially-extended ribs are provided at external circumference of the coupling sleeve. A plurality of slots are provided at internal circumferential wall of the flywheel chain disk where the flywheel chain disk and the coupling sleeve rotate synchronously, in such a manner that the plural slots are correspondingly engaged with the plural ribs. In addition, the end cap is arranged, coaxially, neighboring to the coupling sleeve so as to position the same.

The positioning end of the sleeve is provided with at least one engaging portion, so that the sleeve can be correspondingly engaged with and stopped at the positioning groove of the bicycle frame through the at least one engaging portion, and that the sleeve will not rotate relative to the bicycle frame. According to the present invention, the positioning groove may be of various shapes so long as being engaged and stopped with each other, and no rotation relative to each other, can be achieved. For instance, the positioning groove may be of rectangular, and that the engaging portions may be designed to be of two parallel engaging surfaces such that the positioning groove and the engaging portions can be engaged and stopped with each other. Of course, the positioning groove can also be other shape, such as square, hexagonal, or octagonal, etc. Therefore, the engaging portions may be of similar shapes as that of the positioning groove for correspondingly engaging and stopping with the positioning groove in order to avoid rotation of the same. Or even if there is only one engaging surface for the engaging portion is sufficient for engaging and stopping with only one side of the positioning groove.

Further, according to the present invention, the sleeve is provided, around the whole middle section thereof, with straight slots such that the stator assembly of the motor hub can be engaged with and fixed to the sleeve and be stopped from rotation relative to the bicycle frame.

The motor hub includes a stator assembly, a left cover, a right cover, and a plurality of rotor elements. The plural rotor elements are provided around an inner wall of the left cover or of the right cover. The stator assembly can be engaged with and fixed to the sleeve so as to correspond radially to the plural rotor elements. The left cover and the right cover, after having been in alignment with each other and through bearings, are assembled on the stator assembly. As a result, the left cover and the right cover can rotate relative to the stator assembly.

In the present invention, the elongated axle may be of solid, or of hollow so as to reduce the weight of the motor hub. The head end of the elongated axle may be of internal hexagonal head or of external hexagonal head, or other equivalent structure so long as the fastening and tightening purpose can be achieved, so that the bicycle frame, the motor hub and the sprocket assembly can be fastened.

The above and the following descriptions are for the purpose of exemplification, and for further describing the claims as appended. Other objects, advantages, and novel features of the present invention will become more apparent from the following detailed descriptions when taken in conjunction with the accompanying drawings.

DETAILED DESCRIPTION OF THE PREFERRED EMBODIMENTS

Figure 1:
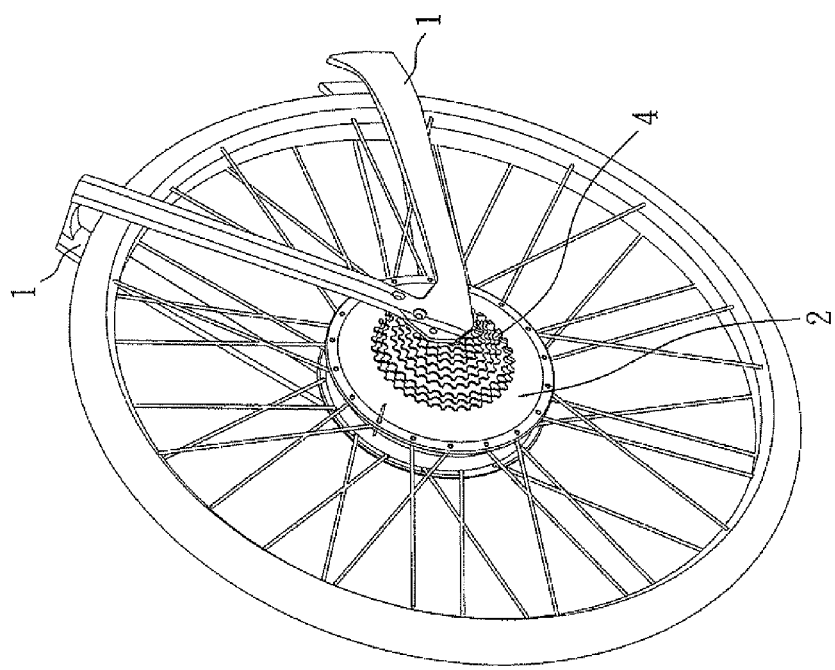
FIG. 1 is a perspective view illustrating a combination structure of bicycle frame and motor hub according to the present invention.

Referring to FIG. 1, a perspective view illustrating a combination structure of bicycle frame and motor hub according to the present invention, a motor hub 2 is mounted on the rear wheel of a bicycle frame 1, where a sprocket assembly 4 is positioned beside the motor hub 2.

Figure 2:
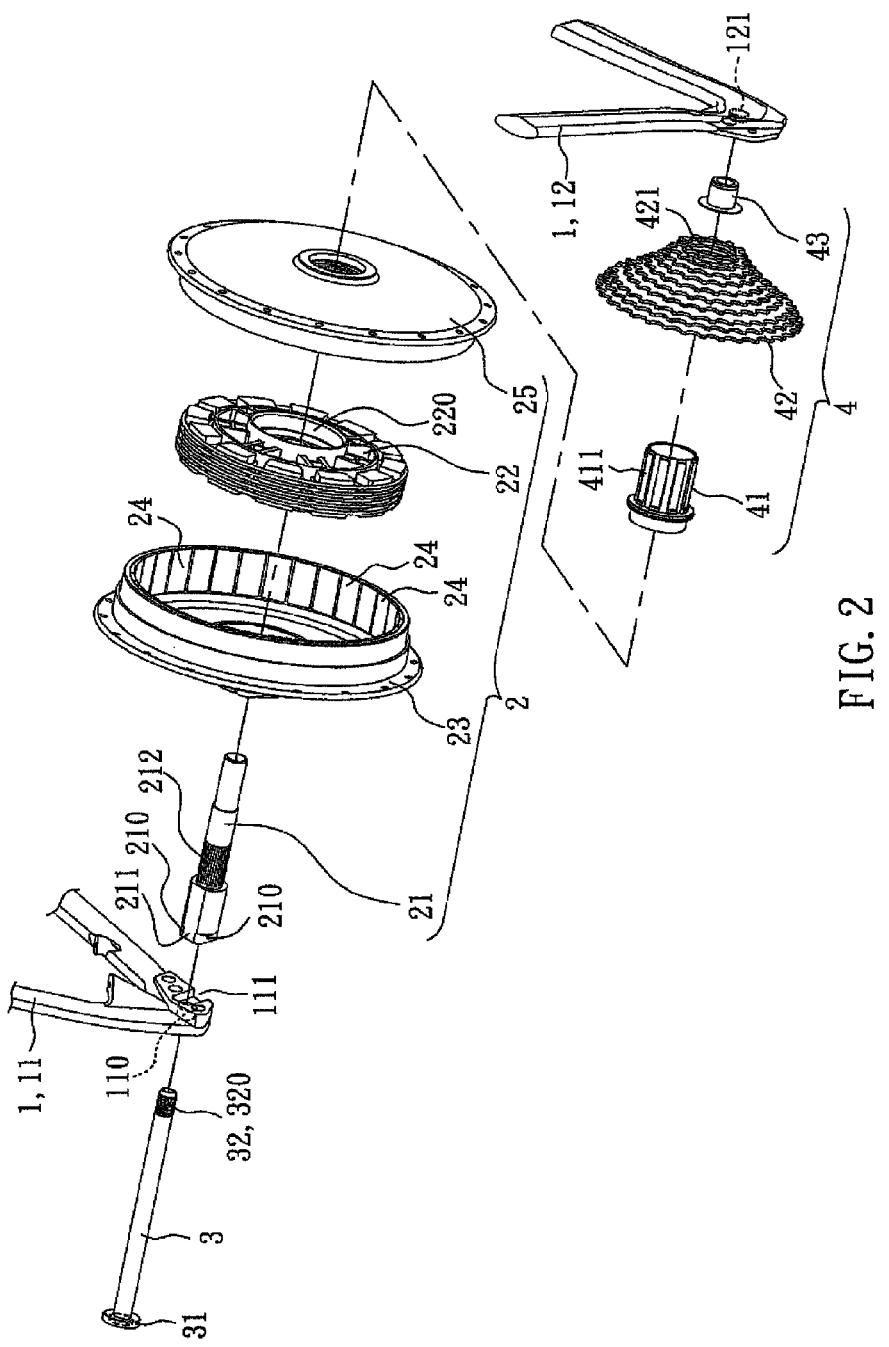
FIG. 2 is an exploded view illustrating the combination structure of bicycle frame and motor hub according to the present invention.
Figure 3:
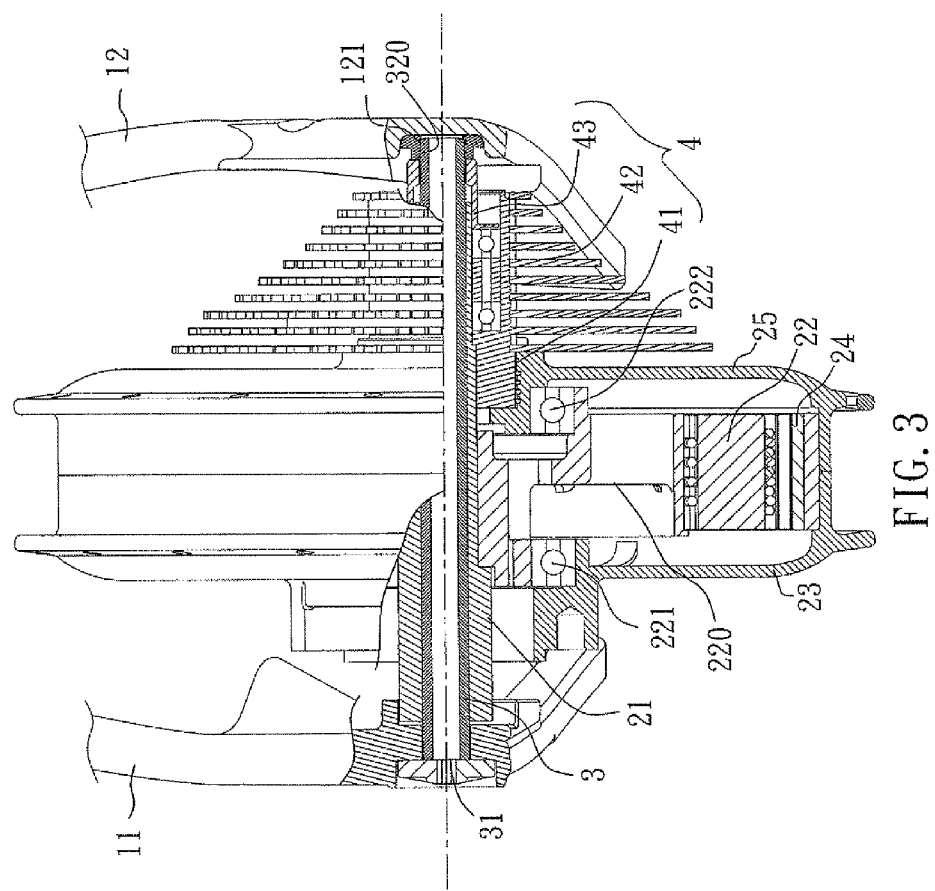
FIG. 3 is a cross-sectional view illustrating the combination structure of bicycle frame and motor hub according to the present invention.

Now referring to FIG. 2, an exploded view illustrating the combination structure of bicycle frame and motor hub, and to FIG. 3, a cross-sectional view illustrating the combination structure of bicycle frame and motor hub, the bicycle frame 1 includes a first fork 11 and a second fork 12 which are oppositely arranged, wherein the first fork 11 is provided with a through hole 110, while the second fork 12 is recessed with an internal thread hole 121 corresponding axially to the through hole 110, and the first fork 11 is provided, at its inner side adjacent to the through hole 110, with a positioning groove 111.

As shown in FIG. 2, the motor hub 2, according to the present invention, includes a sleeve 21, a stator assembly 22, a left cover 23, a right cover 25, and a plurality of rotor elements 24. The sleeve 21 passes through the center of the motor hub 2, where an end of the sleeve 21 relates to a positioning end 211 having two engaging portions 210 at two sides thereof such that the sleeve 21 can be engaged with and stopped at the positioning groove 111 of the first fork 11 by means of the engaging portions 210. In the present invention, the positioning groove 111 of the first fork 11 relates to a rectangular groove; whereas the engaging portions 210 of the sleeve 21 relate to two stopping surfaces parallel with each other, so that the engaging portions 210 will not rotate relative to the positioning groove 111 when they engage with the same.

Further, the sleeve 21 is provided, around the whole middle section thereof, with straight slots 212; and that a corresponding structure is also provided inside a stator hole 220 of the stator assembly 22 such that the stator assembly 22 can be engaged with and fixed to the sleeve 21 through the slots 212 and be stopped from rotation.

According to the present invention, the plural rotor elements 24 are provided around an inner wall of the left cover 23. As shown in FIG. 3, the left cover 23 and the right cover 25, after having been in alignment with each other and through two bearings 221,222, are assembled on the stator assembly 22. As a result, the left cover 23 and the right cover 25 can rotate relative to the stator assembly 22, and rotate together with the sprocket assembly 4 and the rear wheel.

Further, as shown in FIG. 2, the sprocket assembly 4 includes a coupling sleeve 41, a flywheel chain disk 42, and an end cap 43, wherein the left end of the coupling sleeve 41 is attached to the right cover 25 of the motor hub 2. A plurality of axially-extended ribs 411 are provided at external circumference of the coupling sleeve 41 such that the axially-extended ribs 411 correspond to a plurality of slots 421 provided at internal circumferential wall of the flywheel chain disk 42 where the ribs 411 and the slots 421 are engaged with each other and rotate synchronously. The flywheel chain disk 42 is provided, radially, with one or more flywheels in different diameters.

As shown in FIG. 3, the end cap 43 is arranged at one end of the sleeve 21, and, coaxially arranged at the right end of the coupling sleeve 41 so as to fix the sleeve 21 in position. Besides, the end cap 43 keeps away from the second fork 12 a certain distance so as to prevent the coupling sleeve 41 from being worn by the second fork 12 during rotation thereof.

Still further, as shown in FIG. 2, an elongated axle 3 has a head end 31 and a tail end 32, wherein the head end 31 has a hexagonal head and the tail end 32 has an external thread 320. Therefore, when in assembly, the elongated axle 3 can pass through the through hole 110 of the first fork 11 and the sleeve 21 of the motor hub 2, and then the external thread 320 of the tail end 32 is engaged correspondingly and fastened into the internal thread hole 121 of the second fork 12. This makes the assembly work can be completed by one hand from one side. In addition, when screwing the internal hexagonal head of the elongated axle 3, since the engaging portion 210 of the sleeve 21 has been engaged with and stopped at the positioning groove 111 of the first fork 11, the motor hub 2 will not rotate together, and as such, the assembly work becomes convenient. In the present invention, the elongated axle 3 is hollow, so that the motor hub 2 achieves the purpose of lightweight.

According to the present invention, the positioning groove 111 may be of other shape, for instance, square, hexagonal, or octagonal, etc. Likewise, the engaging portions 210, which correspond to the positioning groove 111, can be of similar shape such that the sleeve 21 will be stopped from rotation. This positioning function in a certain direction for the bicycle frame can also be achieved if the sleeve 21 has only one engaging portion 210 engaged with one side of the sleeve 21.

Given the above, it is understood that, according to the present invention, one can extend the elongated axle 3 through the through hole 110 of the bicycle frame 1 and the sleeve 21 of the motor hub 2, and then with one hand, the tail end 32 of the elongated axle 3 can be fastened into the internal thread hole 121 of the bicycle frame 1. This will facilitate assembly of the components of the motor hub 2 and the bicycle frame 1. Besides, when screwing or unscrewing the elongated axle 3, since the elongated axle 3 has passed through the through hole 110 and the internal thread hole 121 opposing each other at the bicycle frame 1, and since the lower edge of the elongated axle 3 is held by the through hole 110 and the internal thread hole 121, the elongated axle 3, during disassembly thereof, can be prevented from escaping out suddenly and thus the motor hub 2 will neither fall nor people get hurt, and thus safety can be assured.

Although the present invention has been explained in relation to its preferred embodiments, it is to be understood that many other possible modifications and variations can be made without departing from the scope of the invention as hereinafter claimed.

What is claimed is:

1. A combination structure of bicycle frame and motor hub, comprising:
   a bicycle frame, including a first fork and a second fork which are oppositely arranged, wherein the first fork is provided with a through hole, while the second fork is recessed with an internal thread hole corresponding axially to the through hole, and the first fork is provided, at its inner side adjacent to the through hole, with a positioning groove which is a rectangular groove;
   a motor hub, being provided, at its center, with a sleeve having a positioning end, such that the positioning end is provided with at least one engaging portion as two parallel engaging surfaces, so that the sleeve can be correspondingly engaged with and stopped at the positioning groove of the first fork through the at least one engaging portion, and that the sleeve will not rotate relative to the first fork; and
   an elongated axle, having a head end and a tail end, wherein the tail end has an external thread, and the elongated axle can pass through the through hole of the first fork and the sleeve of the motor hub, and then the external thread of the tail end is engaged correspondingly and fastened into the internal thread hole of the second fork.

2. The combination structure of bicycle frame and motor hub as claimed in claim 1, further comprising a sprocket assembly including a coupling sleeve and a flywheel chain disk, wherein the coupling sleeve is arranged, coaxially, to the motor hub, and the flywheel chain disk is provided outside of the coupling sleeve such that the flywheel chain disk can rotate synchronously therewith, and the flywheel chain disk is provided, radially, with at least one flywheel.

3. The combination structure of bicycle frame and motor hub as claimed in claim 2, wherein the sprocket assembly further includes an end cap arranged, coaxially, neighboring to the coupling sleeve.

4. The combination structure of bicycle frame and motor hub as claimed in claim 2, wherein a plurality of axially-extended ribs are provided at external circumference of the coupling sleeve, and a plurality of slots are provided at internal circumferential wall of the flywheel chain disk such that the flywheel chain disk and the coupling sleeve rotate synchronously in such a manner that the plural slots are correspondingly engaged with the plural ribs.

5. The combination structure of bicycle frame and motor hub as claimed in claim 2, wherein the motor hub includes a stator assembly, a left cover, a right cover, and a plurality of rotor elements, and wherein the stator assembly can be engaged with and fixed to the sleeve, and the left cover and the right cover, after having been in alignment with each other, are assembled on the stator assembly.

6. The combination structure of bicycle frame and motor hub as claimed in claim 5, wherein the sleeve of the motor hub is provided, around the middle section thereof, with straight slots such that the stator assembly of the motor hub can be engaged with and fixed to the sleeve through the straight slots.

7. The combination structure of bicycle frame and motor hub as claimed in claim 2, wherein the elongated axle is a hollow axle.

8. The combination structure of bicycle frame and motor hub as claimed in claim 2, wherein the head end of the elongated axle is an internal hexagonal head.

9. The combination structure of bicycle frame and motor hub as claimed in claim 1, wherein the motor hub includes a stator assembly, a left cover, a right cover, and a plurality of rotor elements, and wherein the stator assembly can be engaged with and fixed to the sleeve, and the left cover and the right cover, after having been in alignment with each other, are assembled on the stator assembly.

10. The combination structure of bicycle frame and motor hub as claimed in claim 9, wherein the sleeve of the motor hub is provided, around the middle section thereof, with straight slots such that the stator assembly of the motor hub can be engaged with and fixed to the sleeve through the straight slots.

11. The combination structure of bicycle frame and motor hub as claimed in claim 1, wherein the elongated axle is a hollow axle.

12. The combination structure of bicycle frame and motor hub as claimed in claim 1, wherein the head end of the elongated axle is an internal hexagonal head.

* * * * *